(12) United States Patent
Blom et al.

(10) Patent No.: US 9,644,608 B2
(45) Date of Patent: May 9, 2017

(54) METHOD AND SYSTEM FOR SHUTTING DOWN A WIND TURBINE

(71) Applicant: General Electric Company, Schenectady, NY (US)

(72) Inventors: Rogier Sebastiaan Blom, Attenkirchen (DE); Rosa Castañé Selga, Ismaning (DE); Matthijs Leonardus Gerardus Boerlage, Greenville, SC (US)

(73) Assignee: General Electric Company, Niskayuna, NY (US)

( * ) Notice: Subject to any disclaimer, the term of this patent is extended or adjusted under 35 U.S.C. 154(b) by 1171 days.

(21) Appl. No.: 13/726,306

(22) Filed: Dec. 24, 2012

(65) Prior Publication Data

US 2014/0178195 A1   Jun. 26, 2014

(51) Int. Cl.
*F03D 7/02* (2006.01)
*F03D 7/04* (2006.01)

(52) U.S. Cl.
CPC ......... *F03D 7/0268* (2013.01); *F03D 7/0224* (2013.01); *F03D 7/0264* (2013.01); *F03D 7/042* (2013.01); *F03D 7/045* (2013.01); *F05B 2270/404* (2013.01); *Y02E 10/723* (2013.01)

(58) Field of Classification Search
CPC ........ F03D 7/0268; F03D 7/042; F03D 7/045; F03D 7/0224; F03D 7/0264
See application file for complete search history.

(56) References Cited

U.S. PATENT DOCUMENTS

| | | |
|---|---|---|
| 6,137,187 A | 10/2000 | Mikhail et al. |
| 6,441,507 B1 | 8/2002 | Deering et al. |
| 7,488,155 B2 | 2/2009 | Barbu et al. |
| 7,891,944 B2 | 2/2011 | Jeppesen et al. |
| 7,919,880 B2 | 4/2011 | Nielsen et al. |
| 7,956,482 B2 | 6/2011 | Nies et al. |
| 8,123,477 B2 | 2/2012 | Risager et al. |
| 2010/0092292 A1* | 4/2010 | Nies ............... F03D 7/0224 416/41 |
| 2010/0133815 A1* | 6/2010 | Middendorf ........ F03D 7/0224 290/44 |
| 2010/0196156 A1 | 8/2010 | Svendsen et al. |
| 2011/0187107 A1 | 8/2011 | Toyohara et al. |

OTHER PUBLICATIONS

Jianzhong Zhang et al.; Pitch Angle Control for Variable Speed Wind Turbines; DRPT2008 Apr. 6-9, 2008; pp. 2691-2696.

* cited by examiner

*Primary Examiner* — Gregory Anderson
*Assistant Examiner* — Maxime Adjagbe
(74) *Attorney, Agent, or Firm* — Nitin N. Joshi

(57) ABSTRACT

A method and system for shutting down a wind turbine is presented. The method includes determining one or more pitch positions for one or more rotor blades of the wind turbine such that a sum of potential energy and kinetic energy in the wind turbine is minimized. The method further includes pitching the one or more rotor blades from an operating position to the determined pitch positions.

11 Claims, 6 Drawing Sheets

METHOD AND SYSTEM FOR SHUTTING DOWN A WIND TURBINE

BACKGROUND

Embodiments of the present disclosure are related to wind turbines, and more particularly to methods and systems for shutting down a wind turbine.

Wind turbines typically operate in a narrow range of wind speeds. Moreover, wind turbines operate optimally in uniform wind conditions. Accordingly, it may not be desirable to operate a wind turbine during turbulence, excessively high wind speeds or very low wind speeds. In these conditions, the wind turbine is usually shut down. Wind turbines may also be shut down for routine or exceptional maintenance. Typically, to shut down the wind turbine, rotor blades of the wind turbine are brought to a feathered parking position from their operating position. In the feathered parking position, the rotor blades are positioned perpendicular to a wind direction such that one edge of the rotor blades is directed towards a tower of the wind turbine and the other edge of the rotor blades is directed away from the tower. In this position, aerodynamic forces from the wind are practically zero.

During the shutdown process, wind turbines often face issues due to the effects of aerodynamic thrust on the wind turbine. These issues may arise because during the normal operation, the wind often places a positive aerodynamic thrust on the wind turbine in a direction that is perpendicular to a plane of the wind turbine. Subsequently, when a shutdown command is issued, the rotor blades begin to pitch out towards the feathered position. Due to this variation in pitch angle and rotor speed of the rotor blades, the aerodynamic thrust placed on the wind turbine may decrease, which induces oscillations in the wind turbine. Further, as the rotor blades continue to pitch out, the rotor blades may experience a negative aerodynamic thrust. Accordingly, instead of pushing the wind turbine in a downwind direction, the negative aerodynamic thrust may place a pull on the wind turbine in the upwind direction. In this situation, if an upwind oscillation of the wind turbine is synchronized with the upwind pull of the wind turbine, the oscillations of the wind turbine may be aggravated. Consequently, the wind turbine may experience large structural loads, potentially causing wear and damage to the wind turbine.

Currently, various techniques are available to shut down a wind turbine, i.e., pitch the rotor blades from their operating position to the feathered parking position. One technique entails pitching the rotor blades from the operating position to the feathered parking position at a uniform rate. This technique, however, can lead to large vibrations in the fore-aft direction. Another technique, commonly referred to as a triple-pitch braking, is often utilized to prevent the large structural loads associated with shutting down the wind turbine. In the triple-pitch approach, the rotor blades are pitched from their operating position to the feathered parking position in three stages. In a first stage, the rotor blades are pitched at a fast rate for a particular interval of time, for example 1.5 seconds. Thereafter, during a second stage, the rotor blades are pitched at a slower speed for a second interval of time, for example 1.5 seconds. In addition, in a third stage, the pitching rate is once again increased, until the rotor blades reach the feathered position. Though this technique attempts to obviate the shortcomings of the uniform pitching technique, the triple pitch approach is based on a pre-defined pitching profile and an open-loop controlled approach. Particularly, the pitching rate and the time interval for each stage of the three stages is determined based on worst-case expected behavior. Therefore, implementation of the triple pitch approach to shut down the wind turbine may also result in a negative aerodynamic thrust on the wind turbine and the accompanying drawbacks.

In addition to these techniques, various closed-loop controller techniques have been employed to shut down the wind turbine. Moreover, these techniques also attempt to obviate the issues associated with shutting down the wind turbine. One such closed-loop technique is commonly referred to as a zero-acceleration approach. In this approach, the rotor blades are pitched towards the feathered position until the aerodynamic thrust on the wind turbine is reduced to zero. Thereafter, the system controls the pitch angle of the rotor blades such that the aerodynamic thrust remains zero until the tower has reached an equilibrium position. Subsequently, the rotor blades are pitched again towards the feathered position. Though this approach may aid in reducing excessive oscillations in the tower, this approach prolongs the shutdown time.

BRIEF DESCRIPTION OF THE INVENTION

In accordance with aspects of the present disclosure, a method for shutting down a wind turbine is presented. The method includes determining one or more pitch positions for one or more rotor blades of the wind turbine such that a sum of potential energy and kinetic energy in the wind turbine is minimized. The method further includes pitching the one or more rotor blades from an operating position to the determined pitch positions.

In accordance with another aspect of the present disclosure, a system for shutting down a wind turbine is presented. The system includes a computing unit configured to determine a pitch position for one or more rotor blades of the wind turbine such that energy in the wind turbine is minimized. Further, the system includes a pitch actuator configured to pitch the one or more rotor blades from an operating position to the determined pitch position.

In accordance with yet another aspect of the present disclosure, a wind turbine is presented. The wind turbine includes a rotor comprising one or more rotor blades. Moreover, the wind turbine includes a tower operatively coupled to the rotor. In addition, the wind turbine includes a halting system configured to shut down the wind turbine, the halting system including a computing unit configured to determine a pitch position for the one or more rotor blades of the wind turbine such that energy in the rotor and the tower is minimized, and a pitch actuator configured to pitch the one or more rotor blades from an operating position to the determined pitch position.

BRIEF DESCRIPTION OF THE DRAWINGS

These and other features, aspects, and advantages of the present disclosure will be better understood when the following detailed description is read with reference to the accompanying drawings in which like characters represent like parts throughout the drawings, wherein.

DETAILED DESCRIPTION

Aspects of the present disclosure are related to exemplary systems and methods for shutting down a wind turbine. More particularly, the present disclosure presents an exemplary closed-loop controlled system that is configured to continuously determine pitch positions or determine a pitch reference trajectory for one or more rotor blades of the wind turbine in real-time such that energy present in the wind turbine is minimized until one or more rotor blades are positioned in a feathered parking position. As referred to in the present disclosure, the term pitch reference trajectory is representative of multiple pitch position values in a time interval during which the rotor blades are pitched from a starting position to the feathered parking position. Further, the determined pitch positions may aid in minimizing excessive bending and/or fore-aft oscillations in the wind turbine during the shutdown process. To this end, embodiments of the present disclosure utilize interdependency between rotor and tower dynamics. As used herein, the term rotor dynamics is used to refer to the mechanics concerned with the motion of the rotor under the action of various forces such as wind, tower movement, inertia and the like. Additionally, as used herein, the term tower dynamics is used to refer to the mechanics concerned with the motion of a tower of the wind turbine under the action of various forces such as wind, rotor movement, and the like.

Moreover, embodiments of the present disclosure are described with reference to a land-based three-blade wind turbine. It will be understood, however, that such a reference is merely exemplary and that the systems and methods described here may just as easily be implemented in floating wind turbines, offshore wind turbines, 2-blade wind turbines, or n-blade wind turbines without departing from the scope of the present disclosure.

Furthermore, embodiments of the present disclosure are described with reference to an individual wind turbine. However, it will be understood that the teachings of the present disclosure may be utilized to shut down more than one wind turbine simultaneously or to shut down an entire wind farm, without departing from the scope of the present disclosure.

Figure 1:
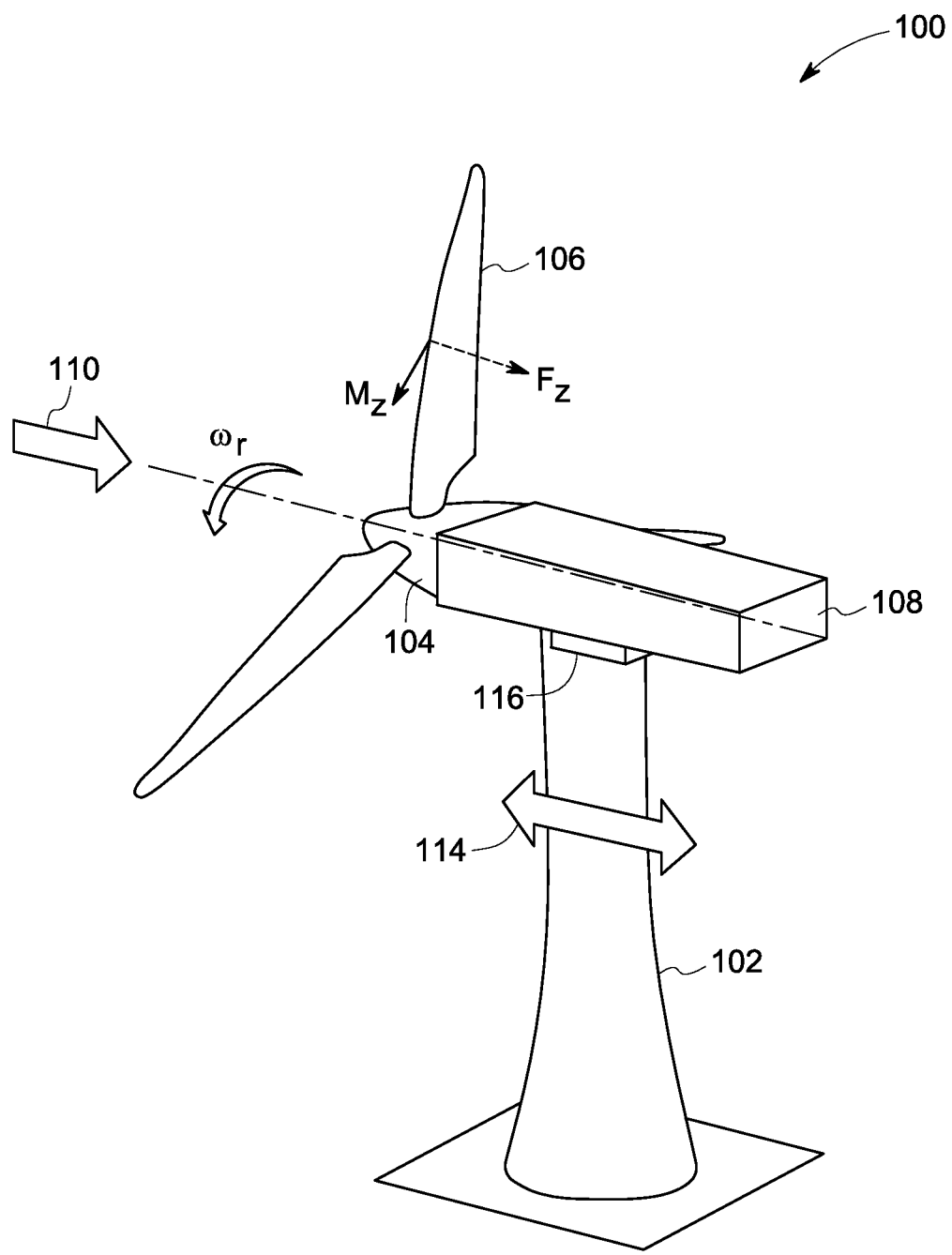
FIG. 1 is a diagrammatical representation of an exemplary wind turbine, according to aspects of the present disclosure.

FIG. 1 is a diagrammatical representation of an exemplary wind turbine 100 according to aspects of the present disclosure. Further, FIG. 1 illustrates forces and motions experienced by the wind turbine 100. The wind turbine 100 includes a tower 102, a rotor 104, one or more rotor blades 106, and a nacelle 108. The tower 102 may be coupled to the ground, to the ocean floor, or to a floating foundation using any known securing means, such as bolting, cementing, welding, and so on.

Further, in FIG. 1 reference numeral 110 is generally representative of wind. The wind 110 may have a mean speed (v) and an effective wind speed ($v_e$). The effective wind speed ($v_e$) may be representative of an effective speed of the wind 110 at a hub height of the wind turbine 100. Since the wind 110 is distributed spatially and temporally, the wind speed varies significantly at different points over the area swept by the rotor blades 106. Therefore, different portions of the wind turbine 100 may experience different wind speeds. Moreover, the effective wind speed ($v_e$) is representative of a difference between the mean wind speed and the tower top velocity. Accordingly, the effective wind speed ($v_e$) is typically utilized in wind turbine models for various computations.

Moreover, as the wind 110 blows in the indicated direction, the wind 110 imposes an aerodynamic torque ($M_z$) and an aerodynamic thrust ($F_z$) on the wind turbine 100. Particularly, the aerodynamic torque ($M_z$) that is imposed on the rotor blades 106 may cause the rotor blades 106 to rotate in a direction that is substantially perpendicular to the direction of the wind 110. This motion of the rotor blades 106 is represented in FIG. 1 by an angular rotor speed ($\omega_r$) of the rotating blades 106. To increase the rotor speed and to convert the rotation of the rotor blades 106 into electricity, the nacelle 108 may include a gearbox (not shown) and a generator (not shown). Alternatively, the nacelle 108 may include a drivetrain (not shown) to generate electricity from the rotation of the rotor blades 106. In such cases, inclusion of the gearbox may be circumvented.

The wind also imposes an aerodynamic thrust ($F_z$) perpendicular to the rotor 104, causing the tower 102 to bend in a downwind direction. Further, this aerodynamic thrust ($F_z$) on the rotor 104 may introduce a bending momentum on the tower 102 in the downwind direction. It may be noted that prior to initiation of the shutdown process, the wind turbine 100 is typically deflected in this downwind position. However, as the shutdown process is initiated and the rotor blades 106 begin to pitch out, the aerodynamic thrust ($F_z$) on the wind turbine 100 may be reduced such that the aerodynamic thrust ($F_z$) is substantially zero. Consequently, the acceleration of the rotor blades 106 may be correspondingly reduced. Further, the reduction in the aerodynamic thrust ($F_z$) may cause the tower 102 to bend towards an upwind position that is beyond a vertical position of the tower 102. This movement of the tower 102 may continue in the upwind direction until an extreme upwind position is reached. Thereafter, the tower 102 may move back in the downwind direction until the tower 102 reaches an extreme downwind position. These oscillations of the wind turbine 100 are often termed as fore-aft oscillations and these oscillations are illustrated in FIG. 1 by the bidirectional arrow 114. During these oscillations of the wind turbine 100, as the rotor blades 106 continue to pitch out, the rotor blades 106 may experience a negative aerodynamic thrust ($F_z$). Such a negative aerodynamic thrust may place a perpendicular pull force on the wind turbine 100, causing the tower 102 to bend in the upwind direction. If, at this time, the oscillations in the tower 102 are also in an upwind direction, the oscillations may be aggravated. Consequently, the wind turbine 100 may experience large structural loads, potentially causing wear and damage to the wind turbine 100.

Accordingly, an exemplary halting subsystem 116 that may be configured to minimize the excessive bending forces created in the wind turbine 100, in accordance with aspects of the present disclosure, is presented. Particularly, the halting subsystem 116 may be configured to shut down the wind turbine 100 while preventing the aerodynamic thrust ($F_z$) from becoming negative when the tower 102 is in an extreme upwind position. In one embodiment, the halting subsystem 116 may be configured to continuously calculate pitch position values until the one or more rotor blades 106 are disposed in the feathered parking position. It may be appreciated that pitch position values are representative of instantaneous pitch angles of the rotor blades 106 at particular instants of time. Moreover, the halting subsystem 116 may be configured to calculate the pitch position values such that any potential energy and/or kinetic energy in the rotor 104 and/or the tower 102 are maximally reduced during the shutdown process. These calculated pitch position values may be communicated to a pitch actuator (not shown in FIG. 1) to position the rotor blades 106 based on the calculated pitch position values.

Figure 2:
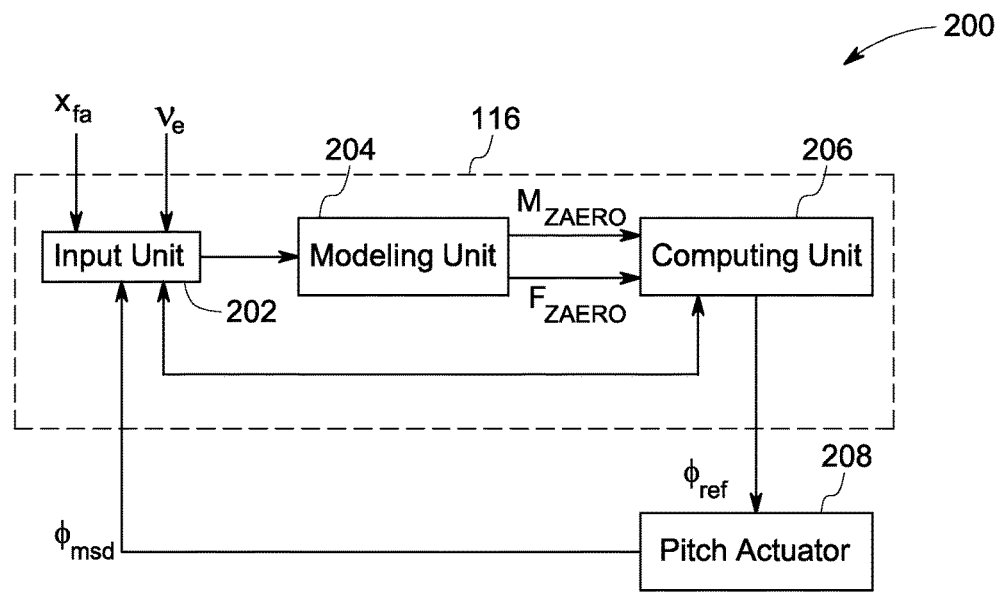
FIG. 2 is a diagrammatical representation of an exemplary system for shutting down a wind turbine, according to aspects of the present disclosure.

FIG. 2 is a diagrammatical representation 200 of one embodiment of the exemplary halting subsystem 116 of FIG. 1, according to aspects of the present disclosure. In a presently contemplated embodiment, the halting subsystem 116 may include an input unit 202, a modeling unit 204, and a computing unit 206. Further, the input unit 202, the modeling unit 204 and the computing unit 206 may be operatively coupled to one another. Wired or wireless means may be employed for such coupling. Moreover, any known communication protocols or standards may be employed for communication between these units, without departing from the scope of the present disclosure. For example, a wired or wireless local access network (LAN) may be employed.

In one embodiment, the halting subsystem 116 may be coupled to a pitch actuator 208. More particularly, the computing unit 206 may be coupled to the pitch actuator 208. Pitch position values computed by the computing unit 206 may be communicated to the pitch actuator 208. These computed pitch position values may be referred to as pitch references. In turn, the pitch actuator 208 may be configured to pitch the rotor blades 106 based on the received pitch references. It will be appreciated that in some cases because of constraints of the pitch actuator 208, the rotor blades 106 may be pitched to a pitch position that may deviate from the received pitch reference. Accordingly, the pitch actuator 208 may be configured to measure the actual pitch position of the rotor blades and communicate this measured pitch position value back to the input unit 202.

The input unit 202 may be configured to determine, in real-time, one or more parameters associated with the wind turbine 100 or the wind 110. It may be noted that as used herein, the term real-time also includes near real-time. Moreover, real-time may also include delays that may be caused because of the time consumed in detecting, communicating, and processing data. In one embodiment, the one or more parameters determined by the input unit 202 may include effective wind speed, current pitch angle of the one or more rotor blades 106, current rotor speed, effective tip speed ratio, and current tower top velocity, for example. Tip-speed ratio is typically representative of a ratio of the rotor speed to the effective wind speed. It will be understood that this list of parameters is not exhaustive and the input unit 202 may be configured to determine the values of other parameters, such as mean wind speed, without departing from the scope of the present disclosure.

In one embodiment, the input unit 202 may be coupled to one or more sensors (not shown) that measure these parameters. By way of example, the input unit 202 may be coupled to an anemometer, a light detection and ranging (LIDAR) sensor, an accelerometer, a pitch angle sensor, and/or a rotor speed sensor. These sensors may detect the various parameters and communicate the sensed values to the input unit 202.

Alternatively, the input unit 202 may be coupled to one or more other devices or units of the wind turbine 100. The input unit 202 may obtain the real-time values of the parameters from these devices or units. For example, the input unit 202 may be coupled to a pitch controller (not shown) or a generator controller (not shown) to receive the values of the parameters. According to yet another embodiment, the input unit 202 may be configured to estimate the values of the parameters or receive estimated values from other models present in the wind turbine 100, without departing from the scope of the present disclosure. For example, the input unit 202 may be configured to estimate the effective wind speed based on the mean wind speed and the tower top velocity. Such estimation is possible because the effective wind speed is representative of the difference between the mean wind speed and the tower top velocity. Moreover, based on an input to a pitch actuator 208, the input unit 202 may be configured to estimate the current pitch angle. Similarly, the tower top velocity may be estimated based on one or more wind turbine models in combination with the current tower top acceleration, current effective wind speed, and current pitch angle.

The modeling unit 204 may be configured to receive the values of the parameters from the input unit 202. In addition, the modeling unit 204 may be configured to determine values of the aerodynamic torque and the aerodynamic thrust. In one embodiment, the modeling unit 204 may be configured to determine the values of aerodynamic thrust and the aerodynamic torque based on the parameter values obtained from the input unit 202 and one or more models stored in the modeling unit 204. For instance, the modeling unit 204 may be configured to store a static aerodynamic lookup table that includes values for aerodynamic torque as a function of pitch angle and tip speed ratio. The current pitch angle may be retrieved from the input unit 202 and the tip speed ratio may be calculated based on the current effective wind speed and rotor speed. Accordingly, based on the current pitch angle and the determined tip speed ratio, the modeling unit 204 may be configured to retrieve current values for the aerodynamic torque from the lookup table. Equation (1) is a simplified model of rotor dynamics that illustrates a relation between aerodynamic torque, pitch angle, tip speed ratio and other factors affecting the rotor 104.

$$J_r \dot{\omega}_r = M_z(\lambda, \theta) - NT_g \tag{1}$$

where, $J_r$ is a moment of inertia of the rotor 104, $\dot{\omega}_r$ is the rate of change in the rotor speed, $\theta$ is the pitch angle of the rotor blades 106, $\lambda$ is the tip speed ratio, N is a gearbox ratio, and $T_g$ is the generator reaction torque.

Similarly, the modeling unit 204 may also be configured to store another aerodynamic model corresponding to the aerodynamic thrust, where the aerodynamic thrust is also a function of pitch angle and tip speed ratio. Further, as described previously, the current pitch angle may be received from the input unit 202 and the tip speed ratio may be calculated based on the current effective wind speed and rotor speed. Based on the current pitch angle and the determined tip speed ratio, the modeling unit 204 may be configured to retrieve current values for aerodynamic thrust from the aerodynamic model. Equation (2) is a simplified model of tower dynamics that illustrates a relation between aerodynamic thrust, pitch angle, tip speed ratio and other factors affecting the tower 102.

$$\ddot{\chi}_{fa} + 2\xi_{fa}\omega_{fa}\dot{\chi}_{fa} + \omega_{fa}^2 \chi_{fa} = K_{fafz} F_z(\lambda, \theta) \tag{2}$$

where $\ddot{\chi}_{fa}$ is the tower top acceleration, $\xi_{fa}$ is the velocity-damping constant of the tower 102, $\omega_a$ is the first mode tower resonant frequency, $\dot{\chi}_{fa}$ is the tower top velocity, $\chi_{fa}$ is the tower deflection, $K_{fafz}$ is a constant reflecting the effect of the aerodynamic thrust on a tower top motion in the fore-aft direction, $F_z$ is the aerodynamic thrust, $\lambda$ is the tip speed ratio, and $\theta$ is the pitch angle.

In one embodiment, the modeling unit 204 may also be configured to estimate energy present in the wind turbine 100 in real-time. To determine the energy in the wind turbine 100, the modeling unit 204 may be configured to combine the rotor dynamics model and the tower dynamics model as depicted in equation (3).

$$\begin{bmatrix} J & 0 \\ 0 & \frac{1}{K_{fafz}} \end{bmatrix} \ddot{x} + \begin{bmatrix} 0 & 0 \\ 0 & \frac{2\zeta\omega_{fa}}{K_{fafz}} \end{bmatrix} \dot{x} + \begin{bmatrix} 0 & 0 \\ 0 & \frac{\omega_{fa}^2}{K_{fafz}} \end{bmatrix} x = \begin{bmatrix} M_{z,aero}(\lambda, \theta) \\ F_{z,aero}(\lambda, \theta) \end{bmatrix} \quad (3)$$

where $$x = \begin{bmatrix} \phi \\ x_{fa} \end{bmatrix}$$

and $\phi$ is rotor angular position (i.e., $\omega_r = \dot{\phi}$).

Upon further simplification, equation (3) may be written as:

$$M\ddot{x} + D\dot{x} + Kx = \mathcal{F}(\lambda, \theta) \quad (4)$$

where $$M = \begin{bmatrix} J & 0 \\ 0 & \frac{1}{K_{fafz}} \end{bmatrix},$$

$$D = \begin{bmatrix} 0 & 0 \\ 0 & \frac{2\zeta\omega_{fa}}{K_{fafz}} \end{bmatrix},$$

$$K = \begin{bmatrix} 0 & 0 \\ 0 & \frac{\omega_{fa}^2}{K_{fafz}} \end{bmatrix},$$

and $$\mathcal{F} = \begin{bmatrix} M_{z,aero}(\lambda, \theta) \\ F_{z,aero}(\lambda, \theta) \end{bmatrix}.$$

The energy in the wind turbine 100 may be computed either offline or in real-time, based on equation (4). More particularly, the energy in the wind turbine 100 may be a sum of potential energy and kinetic energy. Kinetic energy may be present in the wind turbine 100 because of the rotating rotor blades 106 and the oscillating tower 102. Moreover, potential energy may be present in the wind turbine 100 because of the energy stored in the tower 102. The value of the combined potential and kinetic energies may be utilized by the computing unit 206 to determine pitch position values. Further, this combined energy value may be obtained from equation (5):

$$V = \frac{1}{2}(\dot{x}^T)M\dot{x} + \frac{1}{2}x^T Kx \quad (5)$$

where T denotes a vector transpose operator.

In addition, the computing unit 206 may be in communication with the input unit 202 and the modeling unit 204 to aid in the computation of pitch position values to shut down the wind turbine 100. In accordance with aspects of the present disclosure, the pitch position values may be calculated such that the sum of the kinetic energy and potential energy of the rotor 104 and the tower 102 may be minimized over a determined time interval. The time interval may be representative of a period during which the rotor blades 106 are pitched from an initial operating position to the feathered parking position, for example.

Accordingly, in one embodiment, the computing unit 206 may be configured to determine a derivative of equation (5) over the determined time interval. Equation (6) represents this derivation:

$$\dot{V} = -\dot{\chi}^T D\dot{\chi} + \dot{\chi}^T F(\lambda, \theta) \quad (6)$$

As described previously, the control unit 206 is configured to determine pitch position values from time t=0 to a time $\Delta T$, such that during this time interval, the potential energy and kinetic energy experienced by the rotor 104 and the tower 102 are maximally reduced. To obtain these pitch position values, the control unit 206 may be configured to integrate equation (6).

$$\mathrm{argmin}_\theta \int_0^{\Delta T} \dot{V} d\tau = \mathrm{argmin}_\theta \int_0^{\Delta T} -\dot{\chi}^T D\dot{\chi} + \omega M_{z,aero}(\lambda,\theta) + \dot{\chi}_{fa} F_{z,aero}(\lambda,\theta) d\tau \quad (7)$$

where $-\dot{\chi}^T D\dot{\chi}$ is representative of internal damping in the wind turbine 100, $\omega M_{z,aero}(\lambda,\theta)d\tau$ is representative of incremental work performed by the aerodynamic torque on the rotor 104, and $\dot{\chi}_{fa} F_{z,aero}(\lambda,\theta)d\tau$ is representative of the incremental work performed by the aerodynamic thrust on the tower 102.

It may be noted that $-\dot{\chi}^T D\dot{\chi}$, $\omega M_{z,aero}(\lambda,\theta)d\tau$ and $\dot{\chi}_{fa} F_{z,aero}(\lambda,\theta)d\tau$ may generally be referred to as a first term, a second term and a third term of equation (7), respectively. Furthermore, it may be noted that the second and third terms of equation (7) are dependent on the pitch angle ($\theta$). Accordingly, pitch position values corresponding to the time interval may be computed from equation (7), in accordance with aspects of the present disclosure. The set of pitch position values calculated over the determined time interval may be referred to as a pitch reference trajectory. Moreover, the computing unit 206 may be configured to compute the pitch reference trajectory such that equation (7) is minimized over the determined time interval, and consequently the energy within the wind turbine 100 is maximally reduced over the determined time interval. Accordingly, by solving equation (7) for $\theta$, the computing unit 206 may be configured to determine a desired pitch reference trajectory to reach the feathered parking position of the rotor blades 106. The calculated pitch reference trajectory may be employed to pitch the rotor blades 106 such that the rotor blades 106 are positioned in the feathered parking position while minimizing excessive bending forces in the tower 102.

It will be appreciated that a positive value of the second term of equation (7) implies that the energy due to the rotation of the rotor blades 106 is increasing over time, which in turn implies that the acceleration and/or the velocity of the rotor blades 106 is increasing over time. However, a negative value of the second term in equation (7) implies that the energy due to the rotation of the rotor blades 106 is reducing over time, which in turn implies that the acceleration and/or the velocity of the rotor blades 106 is reducing over time. Similarly, a positive value of the third term in equation (7) implies that the energy in the tower and correspondingly the oscillations in the tower are increasing, while a negative value of the third term implies that the energy in the tower 102 is reducing over time, and therefore the oscillations in the tower 102 are being damped.

In one embodiment, equation (7) may be solved offline to determine the desired pitch reference trajectory. In this embodiment, equation (7) may be solved for various wind and wind turbine parameters. Further, pitch reference trajectories for different wind and wind turbine parameters may be determined and stored in a lookup table. Subsequently, when a shutdown command is received, the halting system 116 may detect the wind and wind turbine parameters such as effective wind speed, pitch angle, and tip speed ratio in real time. Moreover, the halting subsystem 116 may be configured to compare these detected parameter values with the stored wind and wind turbine parameter values to retrieve the corresponding pitch reference trajectories. Further, the halting system 116 may be configured to implement the retrieved pitch reference trajectory to pitch the rotor blades 106 to the feathered parking position.

Alternatively, the computing unit 206 may be configured to compute pitch position values in real-time. In one embodiment, the halting system 116 may be configured to utilize a model predictive control (MPC) strategy with a moving horizon to determine the pitch reference trajectory. Model predictive control, also referred to as receding horizon control, is a feedback mechanism in which models are used to predict the system dynamics. In general, the model predictive control problem is formulated as solving in real-time a finite or infinite horizon open-loop optimal control problem subject to system dynamics and constraints involving states and controls. Based on measurements obtained at time t=0, a system controller may be used to predict the future dynamic behavior of the system over a prediction horizon Tp and determine an input such that a determined open-loop performance objective function is optimized. If the system is devoid of any disturbances or model-system mismatch and if the optimization problem is solved for infinite horizons, then the input function calculated at time t=0 may be applied to the system for all times t>0. However, due to disturbances and model-system mismatch, the true system behavior is typically different from the predicted behavior. Further, in order to incorporate the feedback mechanism, the optimized input function obtained at t=0 may be implemented at a first cycle step of the system. A cycle step is representative of one cycle or one complete feedback loop of the system. Subsequently, based on newly detected variable values, the system may be configured to repeat the prediction and optimization procedure to find a new input function with the control and prediction horizons moving forward.

According to embodiments of the present disclosure, the computing unit 206 may be configured to determine optimal pitch position values over the determined time interval based on the MPC strategy. To this end, the halting system 116 may be configured to compute a pitch reference trajectory based on equation (7) and implement a first pitch position value corresponding to the computed pitch reference trajectory for one cycle step of the halting system 116. Moreover, the implemented pitch position value may be communicated to the pitch actuator 208 as a pitch reference to rotate the rotor blades 106. Subsequently, the computing unit 206 may be configured to retrieve real-time measured values for the wind and wind turbine parameters from the input unit 202. Based on these retrieved real-time measured values, the computing unit 206 may be configured to once again determine the pitch reference trajectory. Further, the halting system 116 may be configured to once more implement a first pitch position value corresponding to this computed pitch reference trajectory for a subsequent cycle step of the halting system 116. This process may be repeated until the rotor blades 106 reach the feathered parking position.

Furthermore, it may be noted that equation (5) is representative of a measure of the total energy in the wind turbine 100. This total energy is representative of the potential energy and the kinetic energy in the system. Moreover, the total energy may also be representative of the energy in the rotor 104 and the tower 102 of the wind turbine 100. The total energy in the wind turbine 100 may be maximally reduced over the determined time interval, using equation (7). Moreover, it may be noted the energy in the rotor 104 may be reduced by decreasing the rotor speed at a high rate and the energy in the tower 102 may be reduced by dampening the tower vibrations. Therefore, in accordance with aspects of the present disclosure, in equation (7), it may be desirable to maintain a trade-off between the reduction in rotor speed and dampening of the tower vibrations to achieve maximal reduction in the total energy over the determined time interval. However, in some applications, instead of reducing the energy in the rotor 104 and the tower 102 equally, it may be desirable to reduce the energy in the rotor 104 to a greater extent while the energy in the tower 102 may be reduced to a lesser extent or vice-versa. Accordingly, in one embodiment, the computing unit 206 may be configured to apply different weights to the energy in the tower 102 and the energy in the rotor 104 as depicted in equation (8):

$$V = \alpha \frac{1}{2}\dot{x}^T M \dot{x} + \beta \frac{1}{2} x^T K x \qquad (8)$$

where $\alpha$ is a weight associated with the energy in the rotor 104 and $\beta$ is the weight associated with the energy in the tower 102.

Moreover, the weights may be based on a desired application. For instance, in case there are no constraints on the tower vibrations, the halting system 116 may be configured to pitch out the rotor blades 106 at a maximum pitch out rate. In this case, a lower weight may be applied to the energy in the tower 102, while a higher weight may be applied to the energy in the rotor 104. Similarly, if the tower is experiencing excessive vibrations, the halting system 116 may be configured to pitch the rotor blades 106 towards the feathered parking position at a slower rate. In this case, the weight applied to the energy in the rotor 104 may be substantially lower than the weight applied to the energy in the tower 102. It will be understood that applying weights in equation (5) to obtain equation (8) is one technique of balancing the trade-off between the energy in the rotor 104 and the tower 102 and any other technique may be utilized to achieve this affect without departing from the scope of the present disclosure.

Although, the solution of equation (7) provides optimal pitch position values for shutting down the wind turbine 100, solving this equation may be computationally intensive. Particularly, extensive computation power and time may be utilized to solve equation (7) using the real-time MPC approach. Accordingly, to determine pitch reference trajectories using the MPC approach, the computing unit 206 may include a processor that may be configured to arrive at the solution in a relatively shorter period of time.

In accordance with further aspects of the present disclosure, the control unit 206 may be configured to relax the MPC approach into a simpler approach that determines pitch position values at discrete times. In this embodiment, the speed of the processor in the computing unit 206 may not be a limiting factor in determining the pitch position values. According to this technique, the continuous integration problem of equation (7) may be converted into a discrete problem. To that end, the time interval ($\Delta T$) in equation (7) may be reduced to one cycle step of the halting subsystem 116.

Furthermore, at each cycle step, a subsequent pitch angle that maximally reduces the energy in the wind turbine 100 during the subsequent cycle may be determined. Maximal reduction of the total energy in the wind turbine 100 during the present cycle step may then be approximated by minimization of $\dot{V}$. For example, if $\Delta T_c$ is representative of the cycle time of the halting subsystem 116, then during one cycle step, i.e., a time period from current time $t_k$ to time $t_{k+1}+\Delta T_c$, equation (7) may be expressed as:

$$\theta_{cmd,opt}(t) = \mathrm{argmin}_\theta \int_{t_k}^{t_k+\Delta T_c} \dot{V} d\tau \qquad (9)$$

If dynamics of the pitch actuator 208 are excluded, the solution to the optimization problem of equation (9) may be approximated as:

$$\theta_{cmd,opt}(t_k) \approx \theta(t_k) + \mathrm{argmin}_{\Delta\theta}(\omega M_{z,aero}(\lambda,\theta(t_k)+\Delta\theta) + \dot{\chi}_{fa}F_{z,aero}(\lambda,\theta(t_k)+\Delta\theta)) \qquad (10)$$

where $\theta_{cmd,opt}(t_k)$ denotes the computed pitch position value at time $t_k$, $\mathrm{argmin}_{\Delta\theta}$ ($\omega M_{z,aero}$ ($\lambda,\theta(t_k)+\Delta\theta)+\dot{\chi}_{fa}F_{z,aero}(\lambda,\theta(t_k)+\Delta\theta)$) denotes values of increment or decrement in the pitch position value for which the energy in the wind turbine 100 is maximally reduced in the subsequent cycle, and $\theta(t_k)$ denotes the pitch angle measured at time $t_k$.

It may be noted that the second term of equation (10), $\mathrm{argmin}_{\Delta\theta}$ ($\omega M_{z,aero}$ ($\lambda,\theta(t_k)+\Delta\theta)+\dot{\chi}_{fa}F_{z,aero}(\lambda,\theta(t_k)+\Delta\theta)$), further includes two terms—a torque term, ($\omega M_{z,aero}$ ($\lambda,\theta(t_k)+\Delta\theta$) that is indicative of the work performed by the aerodynamic torque on the rotor 104 and a thrust term ($\dot{\chi}_{fa}F_{z,aero}(\lambda,\theta(t_k)+\Delta\theta$) that is indicative of the work performed by the aerodynamic thrust on the tower 102. In one embodiment, the computing unit 206 may be configured to compute pitch position values based on equation (10) that may result in a positive torque term. It is understood that a positive torque term implies that the energy in the rotor blades 106 is increasing and correspondingly the acceleration and/or velocity of the rotor blades 106 is increasing. Moreover, it is known that while shutting down the wind turbine 100 such a positive value of the torque term is not desirable. However, if a solution of equation (10) results in a positive torque term, such a positive torque term may be permitted if a resultant aerodynamic thrust term has a maximally negative value.

Alternatively, to obtain pitch position values that result in minimum energy in the rotor 104 and the tower 102, the computing unit 206 may be configured to calculate pitch position values that minimize the value of both the torque and thrust terms in equation (10). Moreover, it may be noted that during the shutdown process, the rotor speed may typically have a positive value. Accordingly, the sign of the torque term in equation (10) depends on the sign of the aerodynamic torque. Therefore, the torque term, i.e., the work performed by the torque on the rotor 104, may be minimized by attempting to reduce the aerodynamic torque to a negative value. Moreover, as the aerodynamic torque is dependent on the current pitch angle and the tip speed ratio, the computing unit 206 may be configured to calculate pitch position values such that the aerodynamic torque is minimized. Therefore, during shutdown, the halting system 116 may be configured to compute the subsequent pitch position value such that the torque term of equation (10) may be minimized during the subsequent cycle.

Moreover, the thrust term of equation (10), which is representative of the work performed by the aerodynamic thrust on the tower 102 in one cycle step of the halting system 116 is a product of the tower top velocity and the aerodynamic thrust. It may be noted that the values of the tower top velocity and the aerodynamic torque may change during the shutdown process. For instance, as the tower 102 oscillates between the upwind position and the downwind position, the value of the tower top velocity may vary between a negative value and a positive value. In addition, as the rotor blades 106 pitch towards the feathered parking position and the aerodynamic torque is reduced, the value of the aerodynamic thrust may change from a positive value to a negative value. Accordingly, based on the oscillation position of the tower 102 and the aerodynamic torque, the value of the work performed by the aerodynamic thrust may change from a positive value to a negative value or viceversa. Further, to maintain the work performed by the aerodynamic thrust at a negative value, it may be desirable to maintain either one of tower top velocity or the aerodynamic thrust at a negative value and the other parameter at a positive value. To this end, the computing unit 206 may be configured to determine a pitch position value for the subsequent cycle such that the work performed by the aerodynamic thrust is less than a determined value, such as zero, in the subsequent cycle.

As noted hereinabove, the computing unit 206 is configured to reduce the energy in both the rotor 104 and the tower 102 of the wind turbine 100. However, the energy in the rotor 104 and the tower 102 depend on different parameters. For example, the energy in the rotor 104 depends on the aerodynamic torque and the rotor speed, while the energy in the tower 102 depends on the aerodynamic thrust and the tower top deflection. To calculate a pitch position value such that the energy reduction in both the rotor 104 and the tower 102 is optimized, the computing unit 206 may be configured to utilize a closed-loop control strategy.

In one embodiment, the closed-loop control strategy may depend on the value of the aerodynamic torque and the work performed by the aerodynamic thrust. To that end, the computing unit 206 may be configured to determine the value of the aerodynamic torque. If it is determined that the aerodynamic torque has a value that is greater than a determined value, the computing unit 206 may be configured to calculate consecutive pitch position values such that the rotor blades 106 are pitched in a first direction at a determined maximum pitch-out rate. In one example, the determined value may have a value of zero. However, it may be noted that the determined value may have any other value without departing from the scope of the present disclosure. Further, it may also be noted that the maximum pitch-out rate is representative of a maximum permissible pitch rate in the direction of the feathered parking position based on constraints of the pitch actuator 208. In one embodiment, the first direction may be a direction towards the feathered parking position (i.e., 90° away from the direction of the wind). Moreover, pitching the rotor blades 106 in the first direction may also be referred to as 'pitching out' the rotor blades 106.

However, if it is determined that the aerodynamic torque has a value that is lower than zero and the work performed by the aerodynamic thrust is greater than zero, the computing unit 206 may be configured to calculate a pitch position value such that the rotor blades 106 are pitched in a second direction at a determined maximum pitch-in rate. It may be noted that maximum pitch-in rate is representative of a maximum permissible pitch rate in the direction of the operating position based on the constraints of the pitch actuator 208. In one example, the second direction may be representative of a direction that is substantially opposite to the feathered parking position (i.e., towards the direction of the wind). Moreover, pitching the rotor blades 106 in the second direction may also be referred to as 'pitching in' the rotor blades 106.

Furthermore, the control unit 206 may also be configured to calculate 'pitching in' position values continuously until the value of the work performed by the aerodynamic thrust is reduced to a value below zero. Thereafter, the computing unit 206 may be configured to determine pitch position values such that the rotor blades 106 are pitched out towards the feathered parking position. Accordingly, the computing unit 206 may be configured to continuously calculate the value of the work performed by the aerodynamic thrust to determine whether the work performed by the aerodynamic thrust has a value above or below zero.

Figure 3:
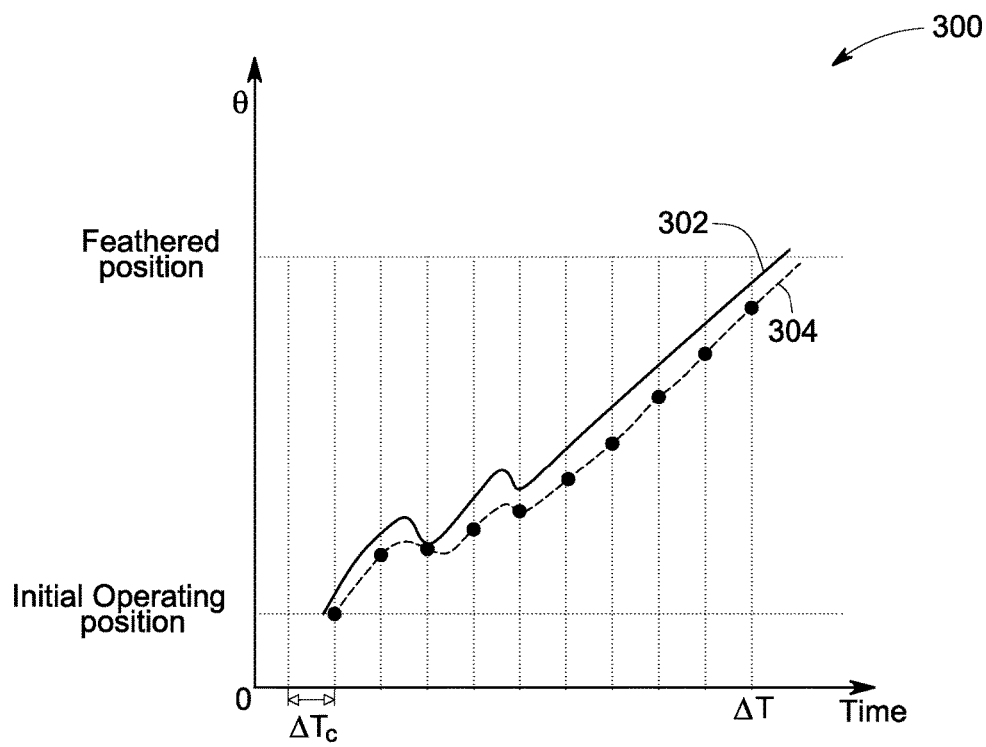
FIG. 3 is a graphical illustration depicting an exemplary pitch reference trajectory and exemplary pitch position values, according to aspects of the present disclosure.

FIG. 3 is a graphical illustration 300 depicting an exemplary pitch reference trajectory and exemplary pitch position values, More particularly, reference numeral 302 is representative of the pitch reference trajectory from an operating position to the feathered parking position. Reference numeral 304 is representative of the pitch position values from the operating position to the feathered parking position of the rotor blades 106 that are computed by the halting system 116. Moreover, the pitch position values 304 may be computed at discrete cycle steps, as depicted in FIG. 3. It may be noted that the pitch reference trajectory 302 may be computed based on equation (7) and the pitch position values 304 may be computed based on equation (10). In addition, it may be noted that the pitch position values are representative of values of the pitch reference trajectory that are computed at discrete cycle steps. Further, the pitch reference trajectory 302 and the pitch position values 304 depend on a number of parameters such as effective wind speed, current pitch angle, tip speed ratio and the like.

Figure 4:
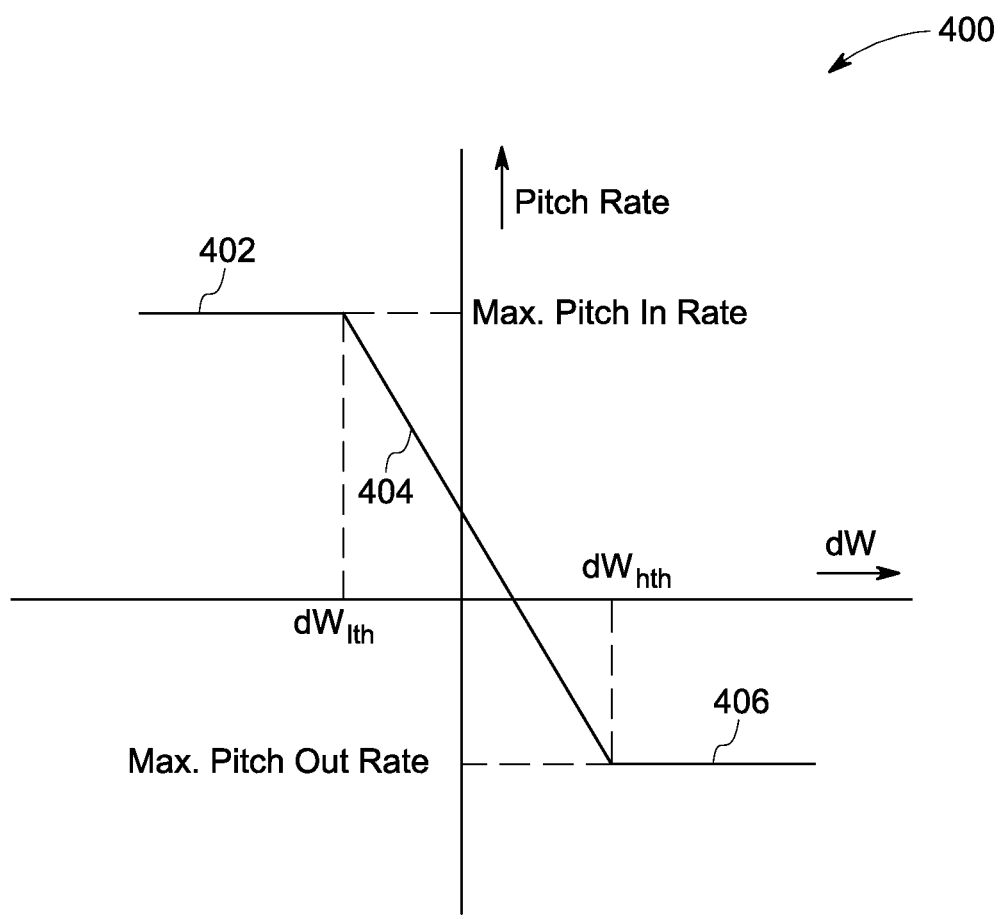
FIG. 4 is a graphical illustration depicting a relationship between a pitch rate and incremental work performed by aerodynamic thrust on a tower of a wind turbine, according to aspects of the present disclosure.

In another embodiment, the computing unit 206 may be configured to introduce a transition zone between the pitching in and pitching out pitch position values. For instance, a determined first threshold value and a second threshold value may be stored in the computing unit 206. The first and second threshold values may be representative of lower and upper bounds on the threshold values. For example, the lower threshold value may be a value below zero, while the upper threshold value may be zero. FIG. 4 is a graphical representation 400 illustrating the transition zone. In particular, the transition zone is based on a relationship between the pitching rate of the rotor blades 106 and the value of the work performed by the aerodynamic thrust on the tower 102. The pitching rate is represented on the Y-axis and the work performed by the thrust is represented on the X-axis. Further, the lower threshold value and the higher threshold value are represented as $dW_{lth}$ and $dW_{hth}$ on the X-axis.

The computing unit 206 may be configured to compare the calculated value of the work performed by the aerodynamic thrust with the lower and higher threshold values. If it is determined that the value of the work performed by the aerodynamic thrust is lower than the lower threshold value ($dW_{lth}$), the computing unit 206 may be configured to calculate consecutive pitch position values such that the rotor blades 106 are pitched out at a first rate. This pitch-out rate is illustrated in the graphical representation 400 by reference numeral 402. However, if it is determined that the value of the work performed by the aerodynamic thrust lies between the lower threshold value ($dW_{lth}$) and higher threshold value ($dW_{hth}$), the computing unit 206 may be configured to calculate pitch position values such that the rotor blades 106 are pitched out at a second rate. In one example, the second rate may gradually decrease from the first rate to a third rate between the lower threshold value ($dW_{lth}$) and the higher threshold value ($dW_{hth}$). The inclined line 404 in the graphical representation 400 depicts this variable second pitch-out rate. Moreover, if it is determined that the value of the work performed by the aerodynamic thrust is higher than the higher threshold value ($dW_{hth}$), the computing unit 206 may be configured to calculate a pitch position value in the second direction such that the rotor blades 106 are pitched in towards the operating position at the third rate. Line 406 is representative of this pitch-in rate.

Moreover, as described previously, the halting subsystem 116 may include a feedback mechanism. Accordingly, the output of the computing unit 206 may be utilized as an input to the input unit 202 to determine a subsequent output of the computing unit 206. More particularly, the current pitch position value may be utilized as an input to determine the subsequent pitch position value. In this way, the halting subsystem 116 may be configured to determine pitch position values at each cycle to maintain the energy in the wind turbine 100 at a value below zero and consequently prevent the tower 102 from bending excessively.

Figure 5:
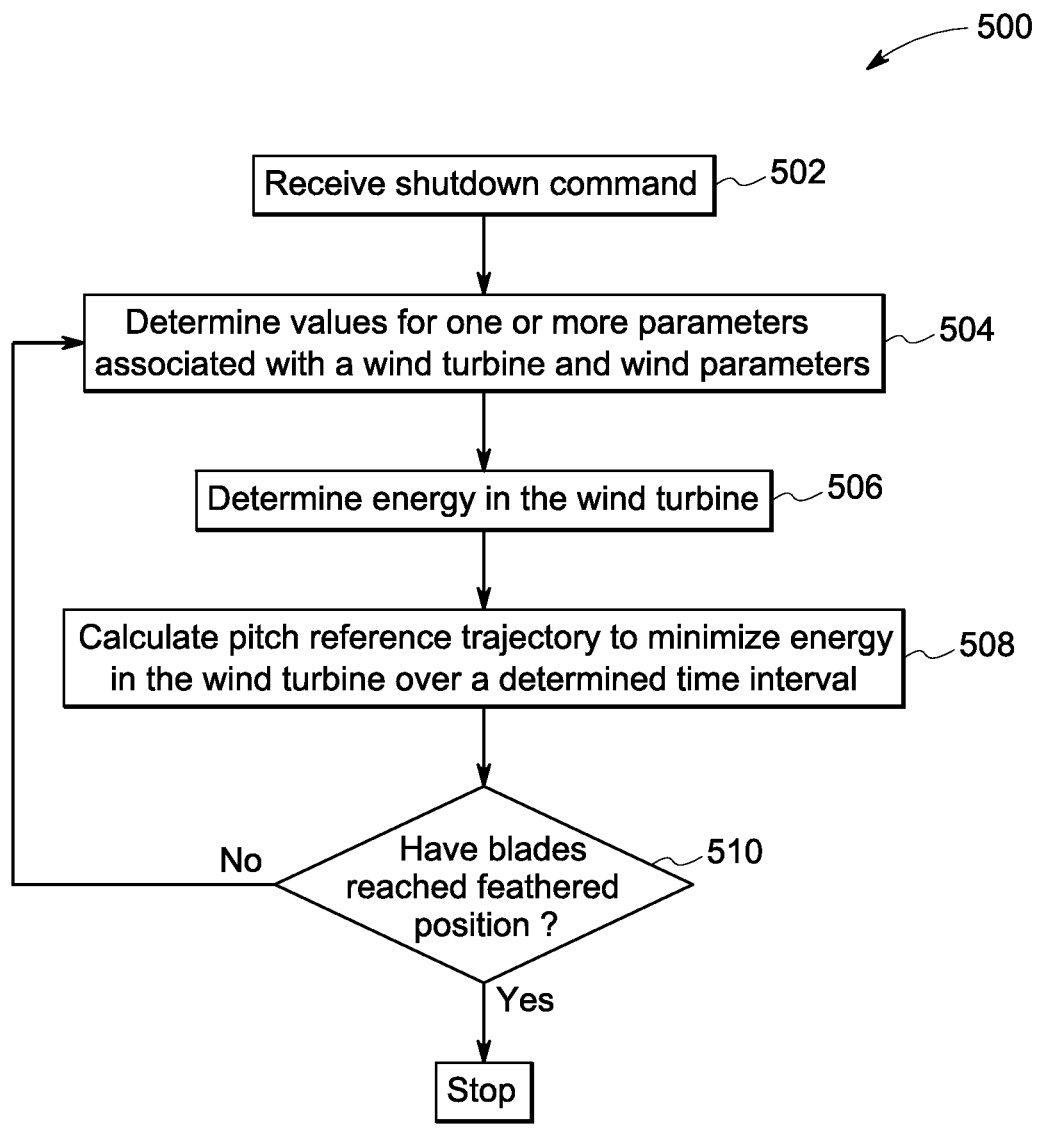
FIG. 5 is a flowchart illustrating an exemplary method for shutting down a wind turbine, according to aspects of the present disclosure.

FIG. 5 is a flowchart 500 illustrating an exemplary method for shutting down a wind turbine, such as the wind turbine 100 of FIG. 1. Specifically, the exemplary method may determine a pitch reference trajectory over a determined time interval to efficiently shut down the wind turbine 100. It will be understood that the method may be performed offline or by utilizing an MPC approach to determine the pitch reference trajectory. In the offline approach, steps of method 500 may be performed offline for all possible wind conditions and initial parameters of the wind turbine. Accordingly, when a shutdown command is received, an appropriate pitch reference trajectory may be retrieved and implemented. In the real-time solution, an MPC approach may be utilized to determine pitch position values based on computed pitch reference trajectories. The method will be described with reference to FIGS. 1-3. As previously noted, the wind turbine 100 may include the halting subsystem 116, which in turn includes the input unit 202, the modeling unit 204, and the computing unit 206.

The method 500 begins at step 502 when a shutdown command is received by the halting subsystem 116. In one embodiment, the shutdown command may be automatically initiated when adverse wind conditions are detected or if a device malfunction is detected. Alternatively, upon detecting a fault condition, an operator may manually transmit the shutdown command. For instance, an operator may issue the shutdown command for a scheduled maintenance.

Subsequently, at step 504, values for one or more parameters associated with the wind and/or the wind turbine 100 may be determined. In one example, the parameters may include effective wind speed, current rotor speed, current pitch angle and current tower top velocity. It will be understood that these parameters are merely exemplary, and the values of any other parameters associated with the wind turbine 100 may also be determined at this step without departing from the scope of the present disclosure. For instance, tip speed ratio may also be determined.

In one embodiment, the input unit 202 may be employed to determine the values of these parameters in real-time. Numerous techniques may be utilized for this determination. For instance, the input unit 202 may be coupled to one or more sensors that are configured to detect the values of the parameters. Alternatively, one or more of these parameter values may be estimated using one or more models stored on the wind turbine 100. For instance, the tower top velocity may be estimated from one or more models, such as tower dynamics, in combination with the current tower top acceleration, current effective wind speed and current pitch angle. In yet another embodiment, the one or more models for estimating the parameter values may be stored in the input unit 202. Moreover, the modeling unit 204 may also determine a current aerodynamic torque value and a current aerodynamic thrust value. Particularly, these values may be estimated from the aerodynamic lookup table and the aerodynamic models stored in the modeling unit 204.

Furthermore, at step 506, energy present in the wind turbine 100 may be calculated. In one embodiment, the modeling unit 204 or the computing unit 206 may be used to determine the energy present in the wind turbine 100. The energy may include kinetic energy and potential energy. For instance, the kinetic energy may be present in the wind turbine 100 because of the rotating motion of the one or more rotor blades 106 and the oscillations induced the tower 102. Further, the potential energy may be present in the wind turbine 100 because of the energy stored in the tower 102. The model for calculating the kinetic energy and the potential energy in the wind turbine 100 may be provided by equation (5) or equation (8).

Subsequently, as depicted by step 508, a pitch reference trajectory may be computed. More particularly, the pitch reference trajectory may be calculated such that the energy in the wind turbine 100 is minimized over a determined time interval. The period over which the energy in the wind turbine 100 is minimized may be representative of time taken to shut down the wind turbine 100 and pitch the rotor blades to the feathered parking position. In one embodiment, the computing unit 206 may be used to compute the pitch reference trajectory. Specifically, the computing unit 206 may be configured to calculate the pitch reference trajectory based on equation (7). Moreover, the pitch reference trajectory may be calculated over the time interval 0 to ΔT to aid in bringing the rotor blades 106 to the feathered position. In the interim, the calculated pitch reference trajectory may cause the rotor blades 106 to pitch-in or pitch-out.

Further, in case of an offline approach, pitch reference trajectories may be calculated for all possible wind and wind turbine parameters beforehand and stored in a lookup table in the halting subsystem 116. Based on the currently detected wind and wind turbine parameters determined at step 504, the computing unit 206 may be configured to retrieve a pitch reference trajectory from the lookup table and implement that pitch reference trajectory.

In case of the MPC approach, the computing unit 206 may be configured to determine the pitch reference trajectory in real-time based on equation (7). Further, the computing unit 206 may be configured to implement a first pitch position value of the pitch reference trajectory. Thereafter, process steps 504-508 may be repeated to determine the pitch reference trajectory. Again, the computing unit 206 may be configured to implement the first pitch position value corresponding to the computed pitch reference trajectory. This method 500 may accordingly be repeated in such a manner until the rotor blades 106 reach the feathered position.

Accordingly, at step 510, a check may be performed to determine if the rotor blades 106 are positioned in the feathered parking position. If it is determined that the rotor blades 106 are positioned in the feathered parking position, the method may be stopped. However, if it is determined that the rotor blades 106 are not positioned in the feathered parking position, the method 500 may continue to determine pitch reference trajectories and steps 504-508 may be repeated to implement the first pitch position value from the computed pitch reference trajectory.

It may be noted that in addition to the halting subsystem 116, mechanical braking and/or generator braking may also be utilized to shut down the wind turbine 100. Moreover, the mechanical braking and/or the generator braking may be applied during the shutdown process, after the rotor blades 106 have reached the feathered position or before the shutdown process begins without departing from the scope of the present disclosure. Further, the mechanical or generator braking may be applied periodically, intermittently (e.g., on/off steps) or continuously (e.g., proportional or smooth linear braking) without departing from the scope of the present disclosure.

In accordance with further aspects of the present disclosure, a computationally simpler method may be utilized to determine pitch position values that result in maximally reduced energy in the wind turbine 100. Accordingly, the time interval utilized in equation (7) may be reduced to one cycle step of the halting system 116.

Figure 6:
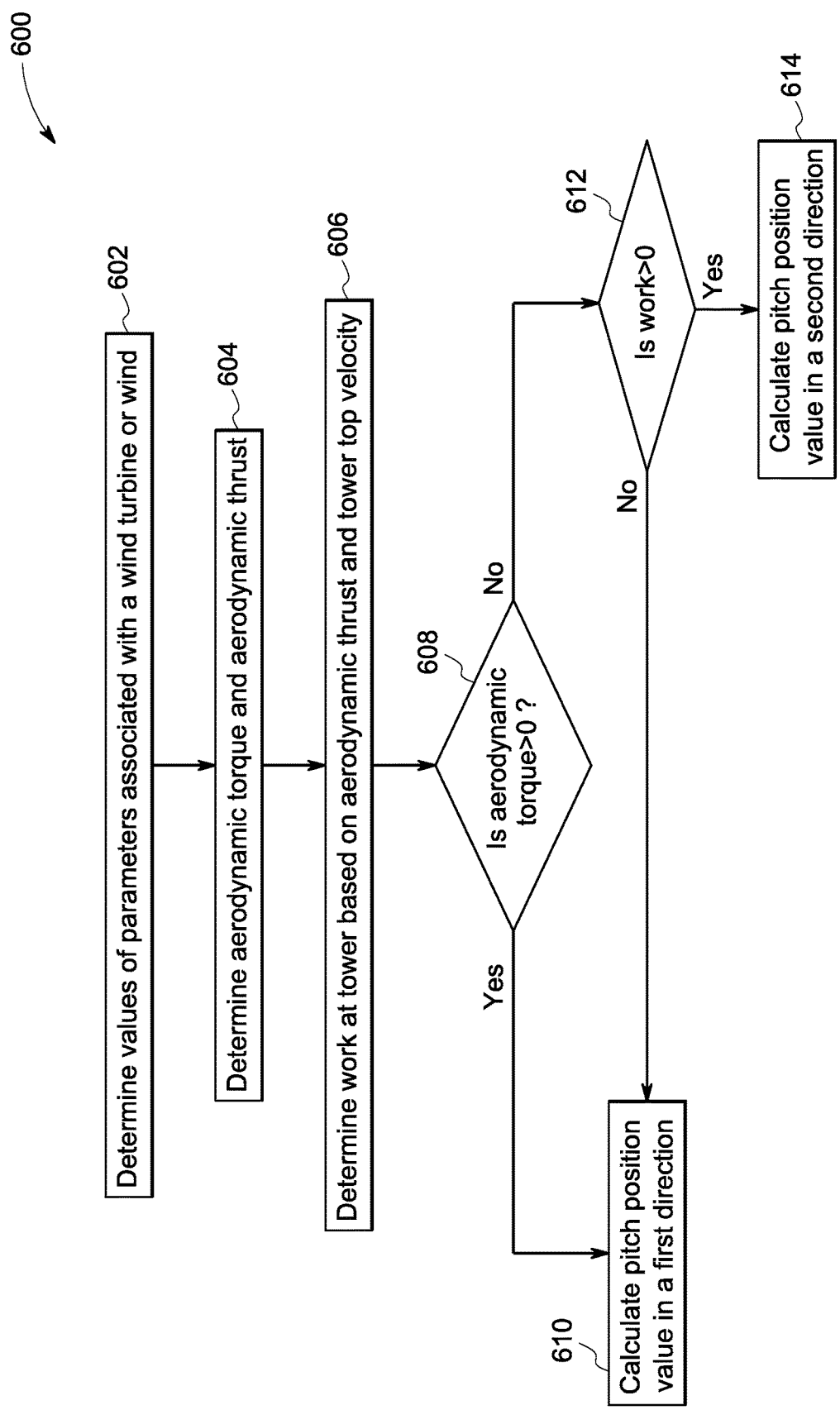
FIG. 6 is a flowchart illustrating another exemplary method for shutting down a wind turbine, according to aspects of the present disclosure.

FIG. 6 is a flowchart 600 illustrating another exemplary method for shutting down a wind turbine according to aspects of the present disclosure. This method will be described with reference to FIGS. 1-5. At step 602, one or more parameters associated with a wind turbine, such as the wind turbine 100 may be determined. Moreover, one or more parameter values associated with the wind 110 may also be determined at this step. As described previously, the input unit 202 may be configured to receive these values from sensors and/or estimate these values from onboard models. The parameters may include one or more of current rotor speed, tip speed ratio, current pitch angle, current tip speed ratio, current tower top velocity, and effective wind speed.

Furthermore, values of aerodynamic torque and aerodynamic thrust affecting the wind turbine 100 may be determined, as indicated by step 604. This step is similar to the step 504 of FIG. 5. Values of the aerodynamic torque and the aerodynamic thrust may be determined from the aerodynamic lookup table and the aerodynamic model stored in the modeling unit 204. In one embodiment, the values of the aerodynamic torque and the aerodynamic thrust may be obtained based on the detected tip speed ratio and the current pitch angle.

Subsequently, the energy in the wind turbine 100 may be determined based on the determined parameter values and the aerodynamic torque and/or the aerodynamic thrust. In one embodiment, the computing unit 206 may be configured to determine the energy present in the rotor blades 106 and the tower 102 at a given instant of time. As previously noted, according to equation (10), the energy in the rotor 104 depends on the aerodynamic torque and the rotor speed. Moreover, the value of the energy in the rotor 104 depends on the value of the aerodynamic torque. Accordingly, to minimize the energy in the rotor 104, the computing unit 206 may be configured to determine a subsequent pitch angle such that the aerodynamic torque is minimized. Further, the aerodynamic torque may be reduced by increasing the pitch angle towards the feathered parking position. Accordingly, the computing unit 206 may be configured to determine a pitch position value that may maximally reduce the aerodynamic torque and therefore the energy in the rotor 104.

In addition, the work performed by the aerodynamic thrust on the tower 102 may depend on the aerodynamic thrust and the tower top velocity. Accordingly, at step 606, the value of the work performed by the aerodynamic thrust on the tower may be determined based on the aerodynamic thrust and the tower top velocity. It may be noted that the tower top velocity value may be a positive value or a negative value. For instance, when the tower 102 oscillates between the upwind and downwind directions, the value of the tower top velocity may vary from a positive value to a negative value. Moreover, depending on the current pitch angle and the effective wind speed, the value of the aerodynamic thrust may be a positive value or a negative value. For instance, the aerodynamic thrust may have a positive value as long as the rotor blades 106 are accelerating. However, when the velocity of the rotor blades 106 is reduced, the value of the aerodynamic thrust may become negative, which may cause the tower 102 to be pulled in the upwind direction. It may therefore be desirable to reduce the energy in the tower 102 to maintain the work performed by the aerodynamic thrust at a value below zero. To that end, if the value of the tower top velocity becomes negative, the computing unit 206 may be configured to calculate a pitch position value such that the value of the aerodynamic thrust remains positive. Moreover, when the tower top velocity becomes positive, the computing unit 206 may be configured to determine a pitch position value such that the value of the aerodynamic thrust becomes negative.

Moreover, at step 608, the computing unit 206 may be configured to determine whether the current value of the aerodynamic torque is greater than zero. If it is determined that the value of the aerodynamic torque is greater than zero, the computing unit 206 may be configured to determine a pitch position value in a first direction that causes the rotor blades 106 to pitch-out at a maximum pitch out rate, as indicated by step 610. However, at step 608, if it is determined that the value of the aerodynamic torque is less than zero, the computing unit 206 may be configured to determine whether the value of the work performed by the aerodynamic thrust is greater than zero, as indicated by step 612. If it is determined that the value of the work performed by the aerodynamic thrust is greater than zero, the computing unit 206 may be configured to calculate a pitch position value in a second direction such that the one or more rotor blades 106 pitch in towards the operating position at a maximum pitch-in rate, as indicated by step 614. However, at step 612, if the computing unit 206 determines that the value of the work performed by the thrust is less than zero, the computing unit 206 may be configured to continue to determine a pitch position value in the first direction such that the rotor blades 106 pitch out towards the feathered parking position at a maximum pitch out rate.

Accordingly, the computing unit 206 may be configured to compute pitch position values that may cause the rotor blades 106 to pitch out as long as the value of the work performed by the aerodynamic thrust is less than zero. When the work performed by the aerodynamic thrust increases above zero, the computing unit 206 may be configured to compute pitch position values in the second direction such that the rotor blades 106 are pitched in towards the operating position.

In another embodiment, the computing unit 206 may be configured to introduce a transition zone between the pitch-in and the pitch-out pitch position values. For instance, the computing unit 206 may be configured to introduce a transition zone in which the rotor blades 106 are pitched out at a different rate. Within the transition zone, if the value of the work performed by the aerodynamic thrust continues to increase with time, the computing unit 206 may be configured to calculate pitch position values that cause the rotor blades 106 to pitch out at a slower rate until the work performed by the aerodynamic thrust is reduced to a value below zero.

Figure 7:
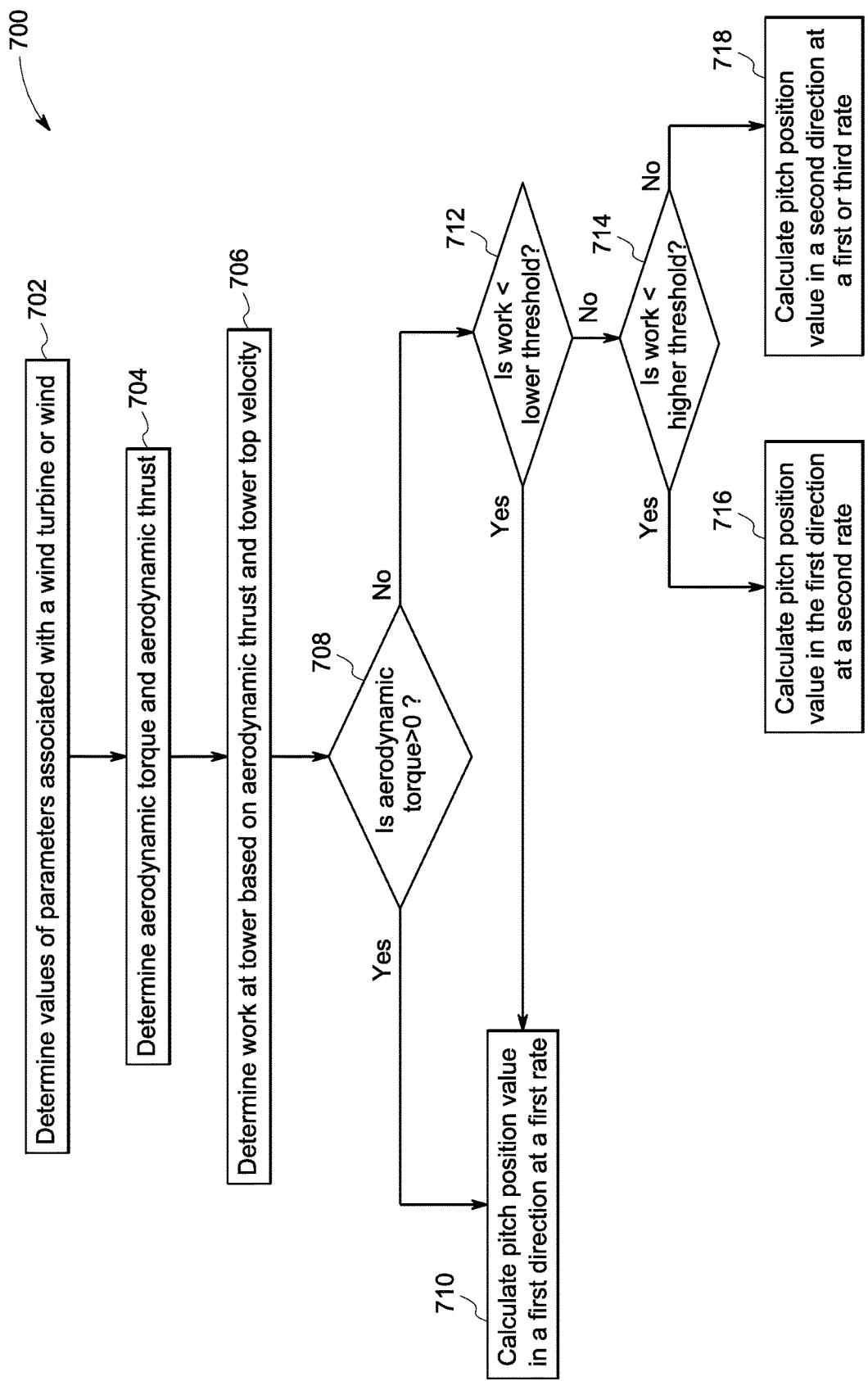
FIG. 7 is a flowchart illustrating yet another exemplary method for shutting down a wind turbine, according to aspects of the present disclosure.

FIG. 7 is a flowchart 700 illustrating an exemplary method for shutting down the wind turbine 100 with a transition zone. Steps 702-708 are substantially similar to the method steps 602-608 of FIG. 6. Particularly, at step 702, the input unit 202 may determine real-time values of wind and wind turbine parameters. Subsequently, values of the aerodynamic torque and aerodynamic thrust may be determined, as indicated by step 704. Further, at step 706, the computing unit 206 may be configured to determine the value of the work performed by the aerodynamic thrust on the tower 104.

In the example of FIG. 7, at step 708, the computing unit 206 may be configured to determine whether a value of the aerodynamic torque is greater than zero. At step 708, if the value of the aerodynamic torque is greater than zero, the computing unit 206 may be configured to calculate a pitch position value in a first direction that causes the rotor blades 106 to pitch out at a first rate, as indicated by 710. However, at step 708, if it is determined that the value of the aerodynamic torque is less than zero, the computing unit 206 may be configured to determine whether the value of the work performed by the aerodynamic thrust is less than a first threshold value, as indicated by step 712. The first threshold value may be representative of a lower threshold value of the work performed by the aerodynamic thrust, in one embodiment.

To determine whether the value of the work performed by the aerodynamic thrust is less than the first threshold value, the computing unit 206 may be configured to compare a value of the current work performed by the aerodynamic thrust (see step 706) with the first threshold value that may be stored in the computing unit 206. If the value of the work performed by the thrust is lower than the first threshold value, the computing unit 206 may be configured to calculate a pitch position value in the first direction that causes the rotor blades 106 to pitch out at the first rate, as indicated by step 710. However, if it is determined that the value of the work performed by the aerodynamic thrust is greater than the first threshold value, the computing unit 206 may be configured to determine whether the value of the work performed by the thrust is greater than a second threshold value, as depicted by step 714. In one example, the second threshold value may be representative of a higher threshold value.

Subsequently, as indicated by step 714, the computing unit 206 may be configured to compare the value of the work performed by the aerodynamic thrust with a second threshold value. If it is determined that the value of the work performed by the aerodynamic thrust is lower than the second threshold value, the computing unit 206 may be configured to compute a pitch position value in the first direction that causes the rotor blades 106 to pitch-out at a second rate, as indicated by step 716. In one embodiment, the second rate may be lower than the first rate. Further, the second rate may be a variable rate that decreases as the value of the work performed by the aerodynamic torque increases from one cycle step to the subsequent cycle step.

However, at step 714, if it is determined that the value of the work performed by the aerodynamic thrust is greater than the second threshold value, the computing unit 206 may be configured to determine a pitch position value in the second direction such that the rotor blades 106 pitch-in at the first rate or a third rate, as indicated by step 718. In one embodiment, the third rate may be faster than the first rate or slower than the first rate but faster than the second rate.

Accordingly, if the value of the work performed by the aerodynamic thrust is below the second threshold value, the rotor blades 106 may be pitched out at the first rate. Alternatively, if the value of the work performed by the aerodynamic thrust is between the first threshold value and the second threshold value, the rotor blades 106 may be pitched out at the second rate. Further, if the value of the work performed by the aerodynamic thrust is greater than the second threshold value, the rotor blades 106 may be pitched in at the first rate or the third rate.

Moreover, the calculated pitch position values may be communicated to the pitch actuator 208 (see FIG. 2) as pitch commands so that the rotor blades 106 may be physically pitched to the calculated pitch position values. It will be understood that both the methods of FIGS. 6 and 7 are repeated continuously from steps 602-614 and 702-718 until the rotor blades 106 are parked in the feathered position and/or the energy in the wind turbine is zero. Accordingly, at determined cycles, the method steps may be repeated. Furthermore, the determined cycles may be configurable. For instance, the halting subsystem 116 may perform the methods of FIG. 6 or 7 every cycle, every 5 cycles, every 10 cycles, and so on without departing from the scope of the present disclosure.

The foregoing examples, demonstrations, and process steps such as those that may be performed by the system may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine-readable media, such as on data repository chips, local or remote hard disks, optical disks (that is, CDs or DVDs), memory, or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a data repository or memory.

Moreover, the various models and static values may be incorporated in any data repository system. For example, these models may be implemented in a read only memory, random access memory, flash memory, relational databases, or any other form of memory without departing from the scope of the present disclosure. Further, these models may be stored in a single data repository or in individual data repositories without departing from the scope of the present disclosure.

The exemplary systems and methods for shutting down the wind turbine may be configured to shut down a wind turbine while preventing excessive bending forces from causing wear to the wind turbine. Moreover, the exemplary halting subsystem may be configured to determine pitch position values or pitch reference trajectories to position rotor blades of the wind turbine in a feathered parking position. Further, the pitch position values are computed such that a sum of potential energy or kinetic energy in the wind turbine is maximally reduced during the shutdown process. Such reduction in the potential energy and kinetic energy enables the halting subsystem to control rotation of the rotor blades and reduce oscillations in the tower.

While only certain features of the invention have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method for shutting down a wind turbine having a tower, a rotor and one or more rotor blades, the method comprising:
   receiving a shutdown command;
   determining real-time values of one or more parameters associated with the wind turbine or wind;
   determining a sum of potential energy and kinetic energy in the rotor and the tower of the wind turbine;
   receiving the real-time values of the one or more parameters associated with the wind turbine or the wind at discrete cycle steps;
   computing the one or more pitch positions at the discrete cycle steps based on the real-time values of the one or more parameters until the one or more rotor blades are disposed in a feathered parking position such that the sum of potential energy and the kinetic energy in the rotor and the tower of the wind turbine are maximally reduced over a predetermined time interval; and
   pitching the one or more rotor blades from an operating position to the feathered parking position.

2. The method of claim 1, wherein the one or more parameters comprise one or more of current pitch angle of the one or more rotor blades, a tip speed ratio, an effective wind velocity, a current rotor speed, and a tower top velocity.

3. The method of claim 1, wherein determining the one or more pitch positions comprises determining a pitch reference trajectory over a determined time interval until the one or more rotor blades are disposed in the feathered parking position.

4. The method of claim 1, further comprising:
   determining one or more pitch reference trajectories based on the one or more parameters associated with the wind turbine or wind;
   storing the one or more pitch reference trajectories; and
   retrieving a pitch reference trajectory corresponding to the real-time values of the one or more parameters associated with the wind turbine or the wind based on a received shutdown command.

5. The method of claim 1, further comprising:
   determining a pitch reference trajectory over a determined time interval based on the real-time values of the one or more parameters associated with the wind turbine or the wind; and
   implementing a pitch position value from the pitch reference trajectory to position the one or more rotor blades according to the pitch position value.

6. The method of claim 1, further comprising:
determining an aerodynamic torque acting on a rotor of the wind turbine based at least on the tip speed ratio and the current pitch angle of the one or more rotor blades; and
determining an aerodynamic thrust acting on a tower of the wind turbine based at least a on the tip speed ratio and the current pitch angle of the one or more rotor blades.

7. The method of claim 6, wherein determining the one or more pitch positions comprises computing a pitch position in a first direction if the aerodynamic torque is greater than a determined value.

8. The method of claim 6, further comprising determining a value of work performed by the aerodynamic thrust in a discrete cycle step, wherein the work performed by the aerodynamic thrust is based on the aerodynamic thrust and the tower top velocity.

9. The method of claim 8, wherein determining the one or more pitch positions comprises computing a pitch position in a second direction if the aerodynamic torque is less than a determined value and the work performed by the aerodynamic thrust is greater than the determined value.

10. The method of claim 8, wherein pitching the one or more rotor blades comprises pitching the one or more rotor blades to the determined pitch position at a first rate if the aerodynamic torque is less than a determined value and the work performed by the aerodynamic thrust is between a first threshold value and a second threshold value, and wherein the determined pitch position is in a first direction.

11. The method of claim 8, wherein pitching the one or more rotor blades comprises pitching the one or more rotor blades to the determined pitch position at a second rate if the aerodynamic torque is less than a determined value and the work performed by the aerodynamic thrust is greater than a second threshold value, and wherein the determined pitch position is in a second direction.

* * * * *